US010784572B2

(12) United States Patent
McAuliffe et al.

(10) Patent No.: US 10,784,572 B2
(45) Date of Patent: Sep. 22, 2020

(54) ELECTRONIC DEVICE WITH SPEAKER AND ANTENNA ISOLATION

(71) Applicant: Apple Inc., Cupertino, CA (US)

(72) Inventors: Erin A. McAuliffe, Campbell, CA (US); Joel D. Barrera, Belmont, CA (US); Jerzy S. Guterman, Mountain View, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 15/655,702

(22) Filed: Jul. 20, 2017

(65) Prior Publication Data

US 2018/0351244 A1 Dec. 6, 2018

Related U.S. Application Data

(60) Provisional application No. 62/514,657, filed on Jun. 2, 2017.

(51) Int. Cl.
*H01Q 1/44* (2006.01)
*H01Q 1/24* (2006.01)
(Continued)

(52) U.S. Cl.
CPC ............. *H01Q 1/44* (2013.01); *H01Q 1/2266* (2013.01); *H01Q 1/243* (2013.01); *H01Q 1/38* (2013.01);
(Continued)

(58) Field of Classification Search
CPC ........ H01Q 1/44; H01Q 1/243; H01Q 1/2266; H01Q 9/06; H01Q 1/38; H04B 1/40
See application file for complete search history.

(56) References Cited

U.S. PATENT DOCUMENTS

| 5,003,610 A | 3/1991 | Kdachi et al. |
| 6,753,827 B2 | 6/2004 | Oshiyama et al. |

(Continued)

FOREIGN PATENT DOCUMENTS

| CN | 1833426 A | 9/2006 |
| CN | 1835644 A | 9/2006 |

(Continued)

OTHER PUBLICATIONS

Kim, Ki-Jin, et al. "High Isolation Internal Dual-Band Planar Inverted-F Antenna Diversity System with Band-Notched Slots for MIMO Terminals," Microwave Conference, 2006. 36th European. IEEE, 2006, Korea.

(Continued)

*Primary Examiner* — Graham P Smith
*Assistant Examiner* — Jae K Kim
(74) *Attorney, Agent, or Firm* — Treyz Law Group, P.C.; G. Victor Treyz; Matthew R. Williams

(57) ABSTRACT

An electronic device may have a speaker mounted in a housing. The housing may have a top face and a longitudinal axis that passes through the top face. A printed circuit may lie parallel to the top face. Input-output circuitry such as a touch sensor and other components may be mounted on the top face overlapping the printed circuit. First and second antennas may be formed on the printed circuit. A speaker may be mounted in the housing facing along the longitudinal axis. A metal layer on a movable portion of the speaker may be patterned to form a slot antenna isolation element or other antenna isolation element. The antenna isolation element may be configured to exhibit a resonance at a frequency of operation of the first and second antennas and may therefore enhance isolation between the first and second antennas.

19 Claims, 5 Drawing Sheets

(51) Int. Cl.
*H04B 1/40* (2015.01)
*H01Q 1/22* (2006.01)
*H01Q 9/06* (2006.01)
*H01Q 1/38* (2006.01)
*H01Q 13/10* (2006.01)
*H01Q 5/385* (2015.01)
*H01Q 5/371* (2015.01)
*H01Q 1/48* (2006.01)

(52) U.S. Cl.
CPC ............... *H01Q 1/48* (2013.01); *H01Q 5/371* (2015.01); *H01Q 5/385* (2015.01); *H01Q 9/06* (2013.01); *H01Q 13/106* (2013.01); *H04B 1/40* (2013.01)

(56) References Cited

U.S. PATENT DOCUMENTS

| | | | |
|---|---|---|---|
| 8,259,017 | B2 | 9/2012 | Schlub et al. |
| 8,698,698 | B2 | 4/2014 | Togashi |
| 9,002,288 | B1 | 4/2015 | Reible |
| 2008/0204347 | A1 | 8/2008 | Alvey et al. |
| 2009/0147972 | A1 | 6/2009 | Hwang |
| 2010/0238072 | A1* | 9/2010 | Ayatollahi ............... H01Q 1/48 343/700 MS |
| 2010/0238079 | A1* | 9/2010 | Ayatollahi ............... H01Q 1/38 343/729 |
| 2011/0298669 | A1* | 12/2011 | Rao ..................... H01Q 9/42 343/702 |
| 2012/0038519 | A1* | 2/2012 | Su ....................... H01Q 21/28 343/702 |
| 2012/0212389 | A1* | 8/2012 | Aizawa .................. H01Q 21/28 343/853 |
| 2012/0274522 | A1* | 11/2012 | Ayatollahi ............. H01Q 1/243 343/745 |
| 2012/0300682 | A1* | 11/2012 | Hartenstein ............. H01Q 5/40 370/297 |
| 2013/0076579 | A1* | 3/2013 | Zhang ................... H01Q 5/364 343/720 |
| 2013/0099980 | A1* | 4/2013 | Hayashi ................. H01Q 9/42 343/700 MS |
| 2013/0127673 | A1* | 5/2013 | Chang ................... H01Q 21/28 343/702 |
| 2013/0147676 | A1* | 6/2013 | Chang ................... H01Q 1/521 343/841 |
| 2013/0293425 | A1 | 11/2013 | Zhu et al. |
| 2014/0078018 | A1* | 3/2014 | Wong .................... H01Q 1/523 343/893 |
| 2014/0085158 | A1* | 3/2014 | Wong ..................... H01Q 1/48 343/841 |
| 2014/0085164 | A1* | 3/2014 | Kashiwagi ........... H01Q 1/2266 343/893 |
| 2014/0139392 | A1 | 5/2014 | Wong et al. |
| 2014/0370804 | A1 | 12/2014 | Dorning |
| 2015/0070236 | A1 | 3/2015 | Walters et al. |
| 2015/0244059 | A1* | 8/2015 | Onaka .................. H01Q 21/28 343/702 |
| 2016/0261022 | A1 | 9/2016 | Guterman et al. |
| 2017/0084985 | A1 | 3/2017 | Ku et al. |

FOREIGN PATENT DOCUMENTS

| | | |
|---|---|---|
| CN | 101627537 A | 1/2010 |
| CN | 201430211 Y | 3/2010 |
| CN | 101872897 A | 10/2010 |
| CN | 102884680 A | 1/2013 |
| CN | 103606728 A | 2/2014 |
| CN | 105009364 A | 10/2015 |
| CN | 105144479 A | 12/2015 |
| CN | 106229627 A | 12/2016 |
| CN | 106450658 A | 2/2017 |
| EM | 1703585 B1 | 2/2005 |
| JP | 2007-501545 A | 1/2007 |
| JP | 2010258495 A | 11/2010 |
| JP | 2016523395 | 8/2016 |
| KR | 1020150027193 A | 3/2015 |
| KR | 1020160061770 A | 6/2016 |
| WO | 2014162472 A1 | 10/2014 |

OTHER PUBLICATIONS

Rowell, Corbett, et al. "Mobile-Phone Antenna Design," Antennas and Propagation Magazine, 2012, IEEE, 54.4, 2012, 14-34.

* cited by examiner

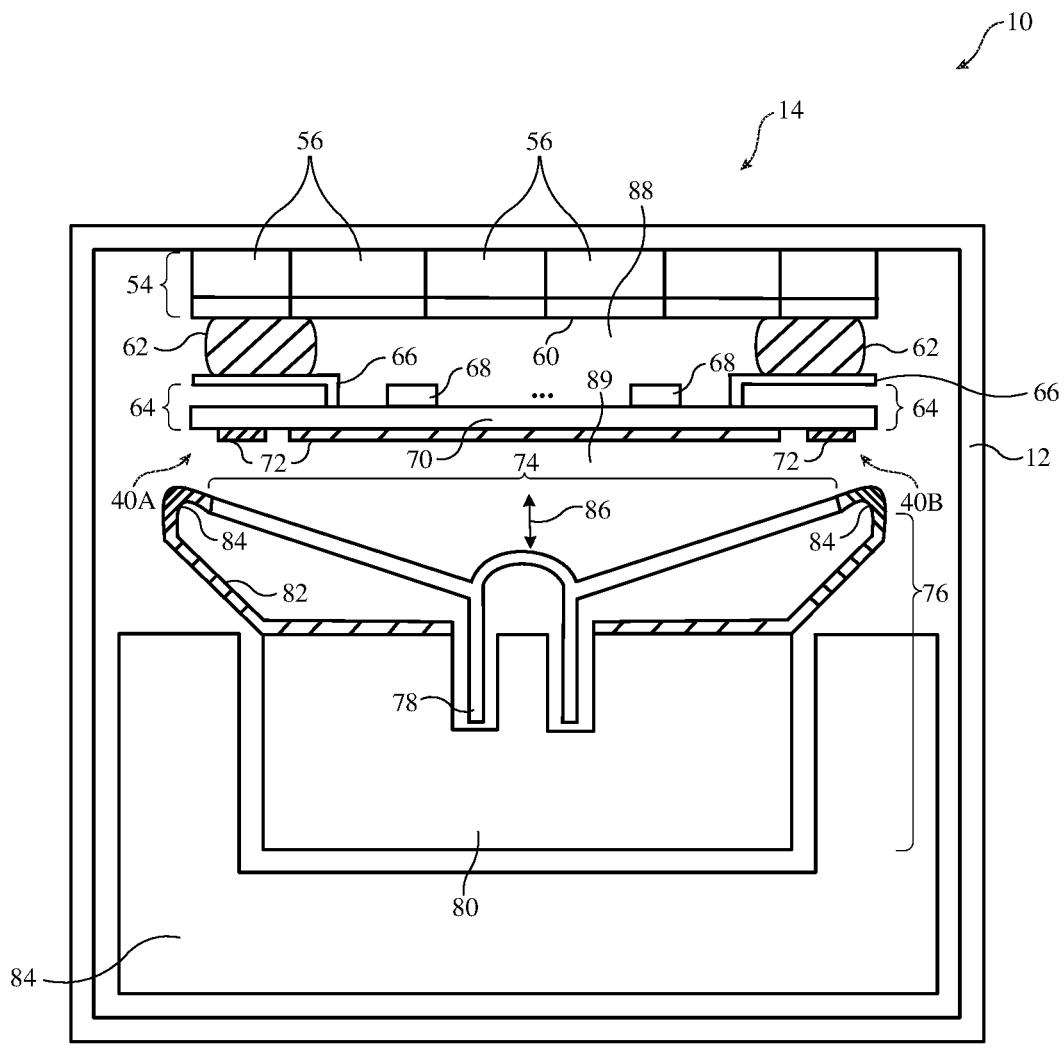
FIG. 3
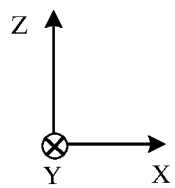

ELECTRONIC DEVICE WITH SPEAKER AND ANTENNA ISOLATION

The application claims the benefit of provisional patent application No. 62/514,657, filed Jun. 2, 2017, which is hereby incorporated by reference herein in its entirety.

BACKGROUND

This relates to electronic devices, and more particularly, to electronic devices with wireless communications circuitry.

Electronic devices are often provided with wireless communications capabilities. To satisfy consumer demand for small form factor wireless devices, it may be desirable to antennas in compact electronic device enclosures. This can make it difficult to achieve desired antenna performance goals. For example, it can be challenging to achieve satisfactory isolation between antennas when antennas are mounted in close proximity to each other.

SUMMARY

An electronic device may have a speaker mounted in a housing. The housing may have a cylindrical shape or other shape characterized by a longitudinal axis and a top face through which the longitudinal axis passes. A printed circuit may lie parallel to the top face. Input-output circuitry such as a touch sensor and other components may be mounted on the top face overlapping the printed circuit.

First and second antennas may be formed on the printed circuit on opposing sides of the device. Shielding structures such as metal shielding cans may be mounted to the printed circuit and may overlap the first and second antennas. The shielding structures may form antenna cavities for the first and second antennas and may help isolate the first and second antennas from the input-output circuitry.

A speaker with a circular outline may be mounted in the housing facing along the longitudinal axis. A metal layer on a moving member in the speaker may be patterned to form a slot antenna isolation element or other antenna isolation element. The antenna isolation element may be configured to exhibit a resonance at a frequency of operation associated with the first and second antennas and may therefore enhance isolation between the first and second antennas.

Radio-frequency transceiver circuitry may be coupled to the antennas and may be used to receive streaming media and other information wirelessly. Control circuitry in the housing may be used to control operation of the device. During operation, the control circuitry may receive media through the radio-frequency transceiver circuitry and antennas and may use the speaker to play the media.

BRIEF DESCRIPTION OF THE DRAWINGS

FIG. 3 is a cross-sectional side view of an illustrative electronic device in accordance with an embodiment.

DETAILED DESCRIPTION

Figure 1:
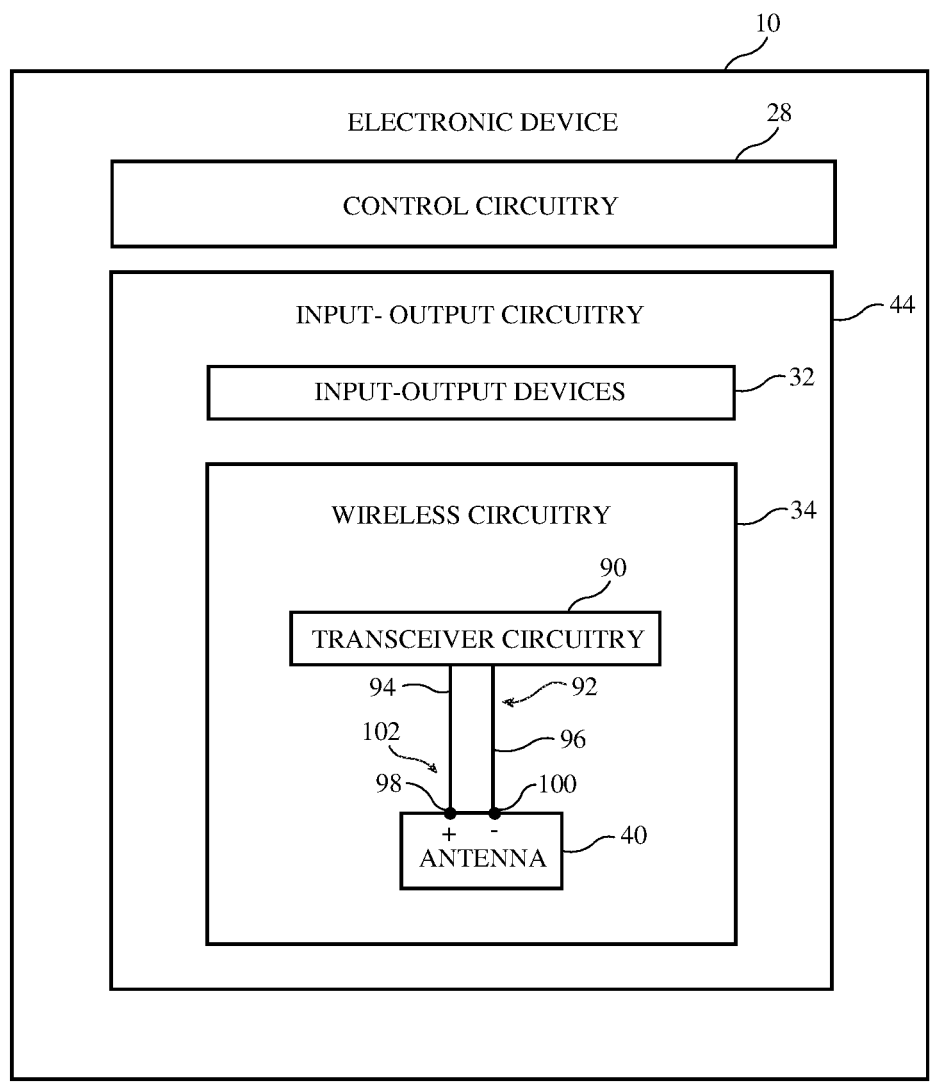
FIG. 1 is a schematic diagram of an illustrative electronic device in accordance with an embodiment.

An electronic device such as electronic device 10 of FIG. 1 may be provided with wireless circuitry. The wireless circuitry may include antennas such as wireless local area network antennas or other antennas. Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, equipment that implements the functionality of two or more of these devices, or other electronic equipment.

As shown in FIG. 1, device 10 may include storage and processing circuitry such as control circuitry 28. Circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 28 may be used to control the operation of device 10. This processing circuitry may be based on one or more microprocessors, microcontrollers, digital signal processors, application specific integrated circuits, etc.

Circuitry 28 may be used to run software on device 10, such as internet browsing applications, voice-over-internet-protocol (VOIP) telephone call applications, email applications, media playback applications, reminder list applications, calendar applications, shopping applications, home automation applications, applications for setting alarms and timers, operating system functions, etc. To support interactions with external equipment, circuitry 28 may be used in implementing communications protocols. Communications protocols that may be implemented using circuitry 28 include internet protocols, wireless local area network protocols (e.g., IEEE 802.11 protocols—sometimes referred to as WiFi®—and protocols for other short-range wireless communications links such as the Bluetooth® protocol), cellular telephone protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch sensors. The touch sensors be optical touch sensors, capacitive touch sensors, and/or other touch sensors. As an example, input-output devices 32 may include two-dimensional capacitive touch sensors. The two-dimensional touch sensors may overlap light-emitting components such as light-emitting diodes that form status indicator lights, displays having arrays of pixels (e.g., liquid crystal display pixels, organic light-emitting diode pixels, crystalline semiconductor dies forming light-emitting diode pixels, and/or other pixels), backlit patterned openings in opaque layers (e.g., to form a logo, text, graphics, etc.), and/or other light-emitting components. Input-output devices 32 may also include light-emitting components such as displays without touch sensor capabilities, buttons (mechanical, capacitive, optical, etc.), scrolling wheels, touch pads, key pads, keyboards, microphones, cameras, buttons, speakers, status indicators, light sources such as light-emitting diodes for illuminating trim features (which may or may not serve as components to provide a user with dynamically adjustable output), audio jacks and other audio port components, digital data port devices, motion sensors (accelerometers), capacitance sensors, proximity sensors, magnetic sensors, force sensors (e.g., force sensors coupled to a display to detect pressure applied to the display), etc.

Input-output circuitry 44 may include wireless circuitry 34 to support wireless communications. Wireless circuitry 34 may include radio-frequency (RF) transceiver circuitry 90 formed from one or more integrated circuits, power amplifier circuitry, low-noise input amplifiers, passive RF components, one or more antennas such as antenna 40, transmission lines such as transmission line 92, and other circuitry for handling RF wireless signals. Wireless signals can also be sent using light (e.g., using infrared communications).

Radio-frequency transceiver circuitry 90 may include wireless local area network transceiver circuitry to handle 2.4 GHz and 5 GHz bands for WiFi® (IEEE 802.11) communications and may include Bluetooth® circuitry to handle the 2.4 GHz Bluetooth® communications band. If desired, circuitry 90 may handle other bands such as cellular telephone bands, near-field communications bands (e.g., 13.56 MHz), millimeter wave bands (e.g., communications at 60 GHz), and/or other communications bands. Configurations in which radio-frequency transceiver circuitry 90 handles wireless local area network bands (e.g., 2.4 GHz and 5 GHz) may sometimes be described herein as an example. In general, however, circuitry 90 may be configured to cover any suitable communications bands of interest.

Wireless circuitry 34 may include one or more antennas such as antenna 40. Antennas such as antenna 40 may be formed using any suitable antenna types. For example, antennas in device 10 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Parasitic elements may be included in antennas 40 to adjust antenna performance. In some configurations, device 10 may have isolation elements between respective antennas 40 to help avoid antenna-to-antenna cross-talk. Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for transceiver circuitry 90. Each antenna 40 may cover one or more bands. For example, antennas 40 may be dual band wireless local area network antennas.

As shown in FIG. 1, radio-frequency transceiver circuitry 90 may be coupled to antenna feed 102 of antenna 40 using transmission line 92. Antenna feed 102 may include a positive antenna feed terminal such as positive antenna feed terminal 98 and may have a ground antenna feed terminal such as ground antenna feed terminal 100. Transmission line 92 may be formed form metal traces on a printed circuit or other conductive structures and may have a positive transmission line signal path such as path 94 that is coupled to terminal 98 and a ground transmission line signal path such as path 96 that is coupled to terminal 100. Transmission line paths such as path 92 may be used to route antenna signals within device 10. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission lines such as transmission line 92 and/or circuits such as these may be incorporated into antenna 40 (e.g., to support antenna tuning, to support operation in desired frequency bands, etc.). During operation, control circuitry 28 may use transceiver circuitry 90 and antenna(s) 40 to transmit and receive data wirelessly. Control circuitry 28 may, for example, receive streaming media wirelessly using transceiver circuitry 90 and antenna(s) 40 and may play the media through a speaker in device 10.

Figure 2:
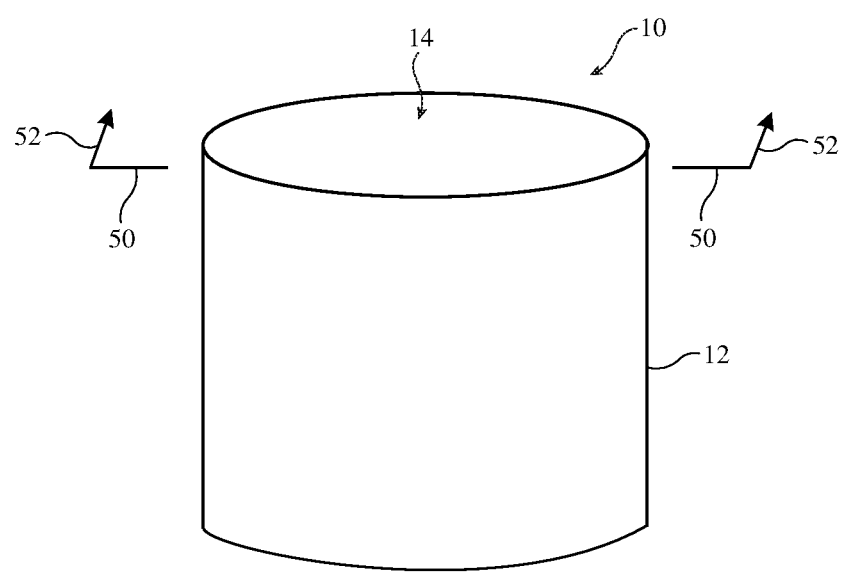
FIG. 2 is a perspective view of an illustrative electronic device in accordance with an embodiment.

A perspective view of an illustrative electronic device such as device 10 of FIG. 1 is shown in FIG. 2. As shown in FIG. 2, device 10 may have a housing such as housing 12. Housing 12, which may sometimes be referred to as an enclosure or case, may be formed of plastic, glass, ceramics, fiber composites, metal (e.g., stainless steel, aluminum, etc.), fabric, other suitable materials, or a combination of any two or more of these materials. Housing 12 may be formed using a unibody configuration in which some or all of housing 12 is machined or molded as a single structure or may be formed using multiple structures (e.g., an internal frame structure covered on some portions with fabric and on other portions with other housing structures and/or input-output components.

As shown in the example of FIG. 2, device 10 may have a housing with a cylindrical shape and may have an upper circular face 14. The cylindrical housing may have a longitudinal axis (Z-axis) that runs vertically through upper circular face 14. A speaker and/or other components may be mounted in the interior of device 10 (e.g., so that the speaker faces upwards in the interior of housing 12 or is otherwise aligned so that the speaker faces along the longitudinal axis of the cylindrical housing). Sound may pass through openings in housing 12, through fabric that covers some or all of the sidewalls of housing 12, and/or through other suitable sound ports. A two-dimensional touch sensor and/or other input circuitry may be mounted on face 14 and one or more light-based output components may be overlapped by the two-dimensional touch sensor (e.g., a display with a pixel array, light-emitting diodes, and/or other light-based output components). A microphone on face 14 and/or elsewhere in device 10 may be used to obtain voice input (e.g., user voice commands for controlling device 10, voice for a voice call, etc.). If desired, device 10 and housing 12 may have other suitable shapes (e.g., rectangular box shapes, domed shapes, pyramidal shapes, spherical shapes, other shapes, and/or combinations of these shapes). The configuration of FIG. 2 is illustrative.

FIG. 3 is a cross-sectional side view of device 10 of FIG. 2 taken along line 50 and viewed in direction 52. As shown in FIG. 3, device 10 may have input-output device(s) on face 14 of device 10 such as input-output circuitry 54. Input-output circuitry 54 may include components 56 on one or more substrates such as substrate 60. Substrate 60 may be, for example, a rigid or flexible printed circuit. Components 56 may be used for gathering touch input and/or other input from a user (e.g., a user's finger touching the upper surface of device 10 on face 14), and/or may be used for providing a user with output (e.g., light-based output). For example, components 56 may include one or more light-emitting diodes, illuminated button labels, pixel arrays forming displays, illuminated trim structures, and/or other light-emitting output devices for providing a user with visual output (status indicator lights, flashing lights, images including content such as text, graphics, video), and/or other visual output. Device 10 may also have sensors, buttons, microphones, and other components (see, e.g., input-output devices 32) for gathering user input and may have haptic devices, audio components, and other devices for providing a user with output.

As shown in FIG. 3, device 10 may include one or more audio speakers such as speaker 76. There may be any suitable number of speakers such as speaker 76 in device 10 (e.g., at least one, at least two, at least three, at least four, at least ten, fewer than 50, fewer than 20, etc.). Speakers in device 10 may include tweeters, midrange drivers, woofers, full-range speakers, etc.

Speaker 76 may include a movable speaker structure such as diaphragm 74 (e.g., a movable speaker member such as a cone, dust cover, and/or other moving speaker structure that moves air when driven and thereby creates sound). Diaphragm 74 may be coupled to speaker support structure 82 by a flexible member such as surround 84, so that diaphragm 74 is free to move during operation. A magnet such as magnet 80 and an electromagnet such as electromagnet 78 may cooperate to move diaphragm 74. For example, electromagnet 78 may be driven with an audio signal during use of speaker 76 to cause electromagnet 78 to move in directions 86 with respect to magnet 80 and thereby move diaphragm 74 so that speaker 76 produces audio output.

Power supply components and/or other components 84 may surround magnet 80 and/or may be mounted elsewhere in the interior of housing 12. If desired, speakers such as speaker 76 of FIG. 3 may have other configurations (e.g., cones with other shapes, different driving arrangements, magnets of other shapes, etc.). The configuration of FIG. 3 is merely illustrative.

Device 10 may include one or more antennas (see, e.g., antenna 40 of FIG. 1) such as a pair of dual-band antennas for supporting wireless local area network (WiFi®) communications and/or other wireless communications. For example, device 10 may include a first antenna such as antenna 40A and a second antenna such as antenna 40B.

Antennas 40A and 40B may be dual band antennas capable of transmitting and receiving signals at 2.4 GHz and 5 GHz or may be configured to operate at other frequencies. Antennas 40A and 40B may be formed from metal traces 72 on a substrate such as printed circuit 70. Traces 72 may be formed on the upper and/or lower surfaces of printed circuit 70 and/or may be embedded within printed circuit 70. Electrical components 68 (e.g. integrated circuits, etc.) may be mounted on the upper and/or lower surface of printed circuit 70 (e.g., using solder).

Shielding structures may be used to prevent interference between antennas 40A and 40B and the circuitry of device 54. For example, metal shielding cans 66 may be soldered to ground traces in printed circuit 70 and may overlap antennas 40A and 40B. As shown in FIG. 3, one of cans 66 may overlap antenna 40A and may create an antenna cavity for antenna 40A and the other of cans 66 may overlap antenna 40B and may create an antenna cavity for antenna 40B. Grounding structures such as conductive gaskets 62 (e.g., conductive foam covered with conductive fabric, etc.) may be used to ground shielding cans 66 to metal traces in printed circuit 60, thereby blocking interference between antennas 40A and 40B and the circuitry on printed circuit 60.

The presence of grounding structures 62 may also create vertical shielding walls that prevent lateral propagation of antenna signals (signal propagation in the XY plane of FIG. 3) in region 88 between printed circuit 60 and printed circuit 70.

Air gap 89 is present between printed circuit 70 and diaphragm 74. This gives rise to a potential interference path for antenna signals. In particular, there is a possibility that antenna signals transmitted from antenna 40A will pass through gap 89 and be received by antenna 40B and vice versa. Interference such as this will decrease wireless performance.

Air gap 89 is present to form a sound passageway and to allow diaphragm 74 to move in directions 86 and create sound that can exit housing 12 (e.g., through openings and/or fabric covering the sidewalls of housing 12 and/or other sound passageways). The inclusion of gaskets such as gaskets 62 on the lower surface of printed circuit 70 would tend to block sound from diaphragm, so this type of gasket placement cannot be used for enhancing antenna isolation.

To satisfactorily isolate antennas 40A and 40B from each other, an antenna isolation element may be incorporated into device 10 in the vicinity of air gap 89. In particular, a parasitic antenna resonating element can be placed in air gap 89 between antennas 40A and 40B (e.g., in a position that is laterally interposed between antenna 40A on the left side of housing 12 and antenna 40B on the opposing right side of housing 12).

The parasitic element may resonate at an antenna frequency associated with antennas 40A and 40B. For example, the parasitic element may be tuned to exhibit a resonance at 2.4 GHz in configurations in which 2.4 GHz antenna-to-antenna coupling issues are more significant than 5 GHz antenna-to-antenna coupling issues. The parasitic element serves as an antenna isolation element that perturbs electric fields in gap 89 and helps to block signals passing between antennas 40A and 40B through gap 89. In particular, the parasitic element helps to block signals from antenna 40A in gap 89 and thereby prevent these signals from reaching antenna 40B and helps to block signals from antenna 40B in gap 89 and thereby prevent these signals from reaching antenna 40A.

Figure 4:
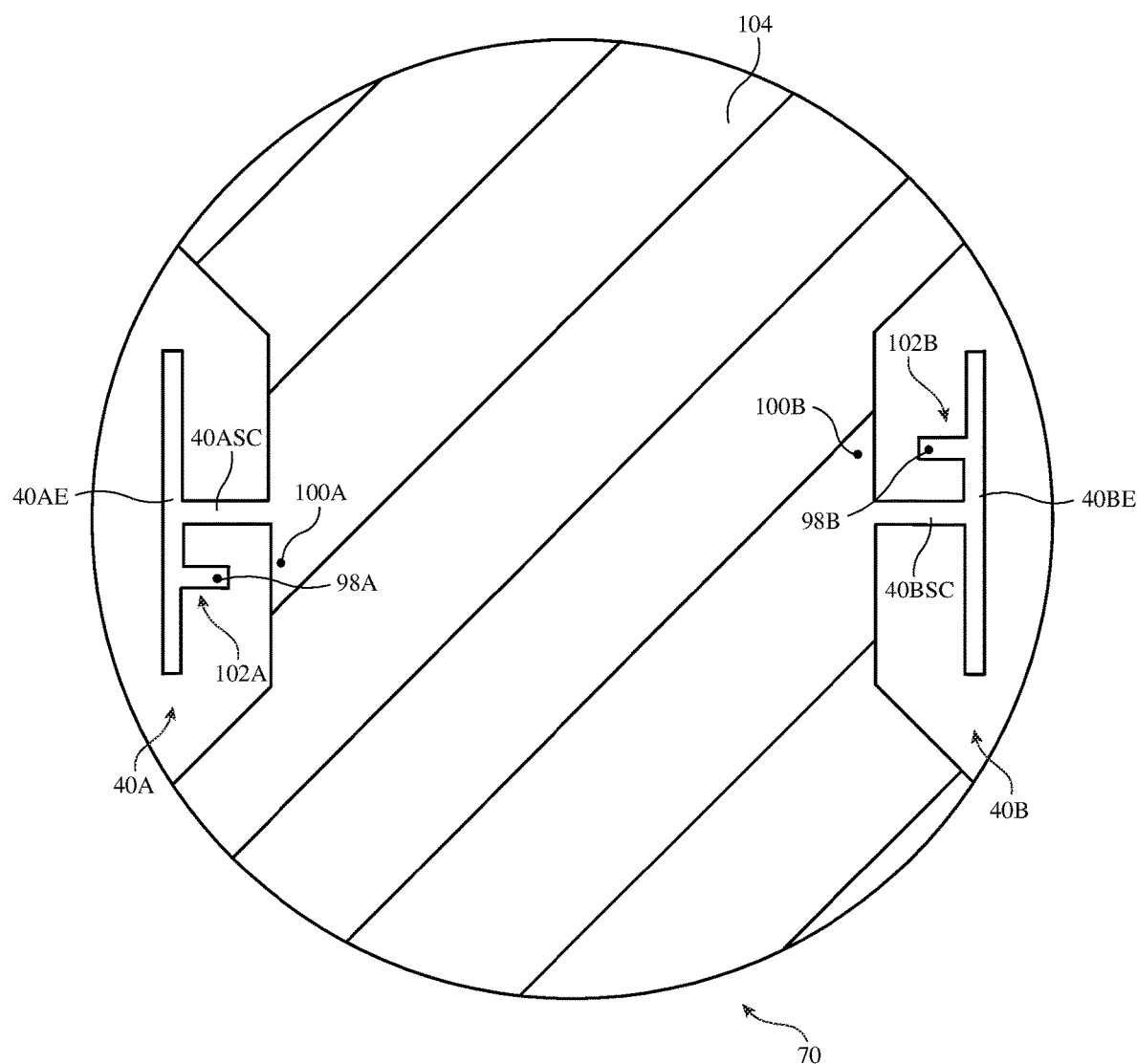
FIG. 4 is a plan view of an illustrative circular printed circuit having metal traces configured to form a pair of dual band wireless local area network antennas in accordance with an embodiment.

FIG. 4 is a view along dimension Z of printed circuit 70 showing how antenna 40A may have an antenna resonating element such as antenna resonating element 40AE and showing how antenna 40B may have an antenna resonating element such as antenna resonating element 40BE. Antenna feed 102A of antenna 40A may include positive antenna feed terminal 98A coupled to a feed branch of element 40AE and may include ground antenna feed terminal 100A coupled to antenna ground 104. Antenna 40A may be a dual band inverted-F antenna having a shorter arm for enhancing resonance at 5 GHz and a longer arm for enhancing resonance at 2.4 GHz. Return path 40 ASC may be coupled between resonating element 40AE and ground 104. Antenna feed 102B of antenna 40B may include positive antenna feed terminal 98B coupled to a feed branch of element 40BE and may include ground antenna feed terminal 100B coupled to antenna ground 104. Antenna 40B may be a dual band inverted-F antenna having a shorter arm for enhancing resonance at 5 GHz and a longer arm for enhancing resonance at 2.4 GHz. Return path 40 BSC may be coupled between resonating element 40BE and ground 104.

Antennas 40A and 40B face away from each other and face outwardly through the walls of housing 12, thereby enhancing isolation between these antennas so that these antennas may be used in a multiple-input-multiple-output arrangement. Transmission lines may be coupled between feeds 102A and 102B and radio-frequency transceiver circuitry 90, as described in connection with transmission line 92 of FIG. 1. The metal traces that form antennas 40A and 40B and the transmission lines may be formed on one or more surfaces of printed circuit 70 and/or may be embedded in printed circuit 70.

Figure 5:
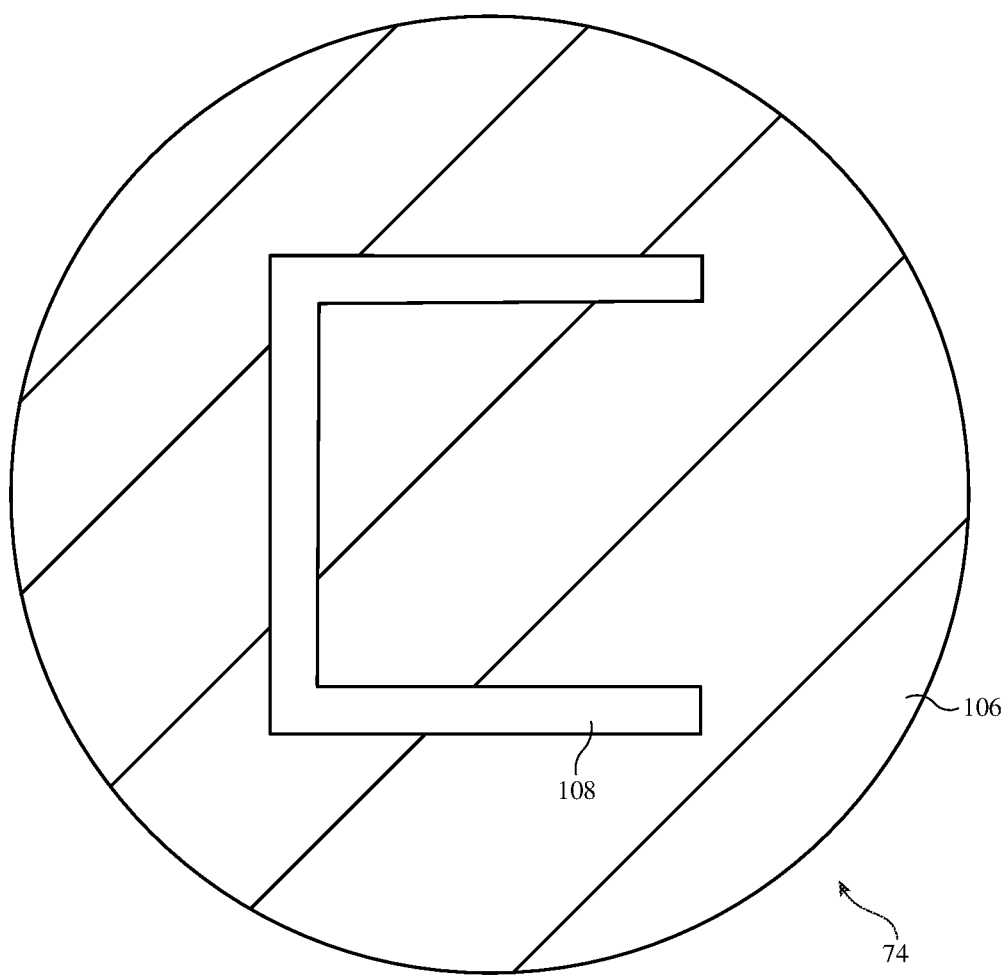
FIG. 5 is a plan view of an illustrative metal layer on a moving speaker structure that has an opening configured to form a slot antenna isolation element in accordance with an embodiment.

FIG. 5 is a view along dimension Z of diaphragm 74 showing how antenna isolation element 108 may, if desired, be formed from a parasitic slot resonating element (a slot antenna isolation element). As shown in FIG. 5, metal layer 106 (e.g., metal traces formed on one or more layers of a polymer carrier, a stamped metal foil layer, etc.) may be cover diaphragm 74 (e.g., metal layer 106 may overlap at least 50%, at least 80%, less than 99.99%, or other suitable amount of diaphragm 74). Isolation element 108 may be formed from an opening in layer 106.

Metal layer 106 may be formed by stamping metal foil with a desired pattern to form a slot-shaped opening for element 108 and by laminating the patterned foil to a paper cone or other supporting structure associated with diaphragm 74 (e.g., using adhesive). Other fabrication techniques may be used, if desired. For example, element 108 may be formed by patterning metal traces using selective conductive trace printing (pad printing, ink-jet printing, screen printing, etc.), by laser processing of a blanket metal film, by photolithographic processing, etc.

Element 108 may be a slot with a length equal to half of a wavelength at 2.4 GHz (or other frequency of interest) so that element 108 exhibits a resonant response at 2.4 GHz. This allows element 108 to perturb electric fields in gap 89 at 2.4 GHz and thereby helps enhance radio-frequency isolation (radio-frequency antenna isolation) between antennas 40A and 40B, particularly at 2.4 GHz. In configurations in which the diameter of diaphragm 74 is insufficient to form a half-wavelength closed slot that is straight, element 108 may have an L-shape or (as shown in FIG. 5) may have a C-shape. If desired, an antenna isolation element such as element 108 may be formed from an L-shaped metal element, a straight strip of metal, or other suitable antenna resonating element shapes. The isolation element may be configured to resonate at any suitable frequency or range of frequencies (e.g. 2.4 GHz, 5 GHz, etc.). If desired, multiple slots or multiple isolation elements of other types may be formed on a movable speaker structure in speaker 76. Configurations in which the isolation element(s) is formed on non-moving speaker structures or other support structures in the interior of housing 12 may also be used. The slot-based antenna resonating element configuration of FIG. 5 is merely illustrative.

The foregoing is merely illustrative and various modifications can be made to the described embodiments. The foregoing embodiments may be implemented individually or in any combination.

What is claimed is:

1. An electronic device, comprising:
a housing;
first and second antennas in an interior of the housing;
a speaker in the housing that has a moving member; and
an antenna isolation element on the moving member that is configured to enhance radio-frequency isolation between the first and second antennas.

2. The electronic device defined in claim 1 wherein the antenna isolation element is formed from a parasitic antenna resonating element.

3. The electronic device defined in claim 2 wherein the parasitic antenna resonating element comprises a slot in a metal layer.

4. The electronic device defined in claim 3 wherein the metal layer is formed on the moving member.

5. The electronic device defined in claim 4 wherein the metal layer comprises metal foil laminated to the moving member.

6. The electronic device defined in claim 3 wherein the first and second antennas comprise respectively first and second dual-band wireless local area network antennas.

7. The electronic device defined in claim 2 wherein the first and second antennas comprise dual band antennas operating at 2.4 GHz and 5 GHz.

8. The electronic device defined in claim 1 wherein the first and second antennas are formed from metal traces on a printed circuit and wherein the printed circuit is separated from the moving member by an air gap.

9. The electronic device defined in claim 8 further comprising first and second shielding cans on the printed circuit that respectively form first and second antenna cavities for the first and second antennas.

10. The electronic device defined in claim 9 further comprising conductive gaskets on the first and second shielding cans.

11. The electronic device defined in claim 10 further comprising input-output circuitry having a substrate, wherein the gaskets extend between the first and second shielding cans and the substrate.

12. The electronic device defined in claim 1 further comprising:
transceiver circuitry coupled to the first and second antennas; and
control circuitry configured to receive media with the transceiver circuitry and the first and second antennas and configured to play the media through the speaker.

13. An electronic device, comprising:
a cylindrical housing having a top face;
a printed circuit overlapped by the top face;
first and second antennas on the printed circuit;
a speaker that has a movable speaker member;
a metal layer on the movable speaker member, wherein the metal layer has an opening that forms a slot antenna isolation element that is configured to provide radio-frequency isolation between the first and second antennas.

14. The electronic device defined in claim 13 wherein the speaker faces along a longitudinal axis of the cylindrical housing.

15. The electronic device defined in claim 14 wherein the slot antenna isolation element is supported by the speaker.

16. The electronic device defined in claim 14 wherein the first and second antennas comprise wireless local area network antennas.

17. An electronic device, comprising:
a speaker having a movable speaker structure;
a metal layer on the movable speaker structure; and
an antenna structure formed from the metal layer.

18. The electronic device defined in claim 17 further comprising first and second wireless local area network antennas, wherein the antenna structure is an antenna isolation element that provides isolation between the first and second wireless local area network antennas.

19. The electronic device defined in claim 18 further comprising:
- a printed circuit on which the first and second wireless local area network antennas are formed;
- a housing having a face that is parallel to the printed circuit; and
- input-output circuitry including at least one touch sensor on the face of the housing.

* * * * *